(12) United States Patent
Elbourne et al.

(10) Patent No.: US 7,379,420 B2
(45) Date of Patent: May 27, 2008

(54) METHOD AND APPARATUS FOR MULTIPLE QUALITIES OF SERVICE TO DIFFERENT NETWORK CONNECTIONS OF A SINGLE NETWORK PATH

(75) Inventors: Trevor Elbourne, Subiaco (AU); Mike Reynolds, Subiaco (AU); Todd B. Lowpensky, Hillsborough, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 813 days.

(21) Appl. No.: 10/120,920

(22) Filed: Apr. 11, 2002

(65) Prior Publication Data

US 2003/0156588 A1    Aug. 21, 2003

(51) Int. Cl.
*H04L 12/54* (2006.01)
(52) U.S. Cl. ...................... 370/230; 370/235
(58) Field of Classification Search .............. 370/229, 370/230, 230.1, 231, 232, 233, 234, 235, 370/235.1, 236, 236.1, 236.2, 237, 238, 238.1, 370/239, 389, 391, 395.2, 395.21, 395.4, 370/395.42, 395.43, 412, 416, 417, 428, 370/543
See application file for complete search history.

(56) References Cited

U.S. PATENT DOCUMENTS

| | | | | |
|---|---|---|---|---|
| 5,179,556 A | * | 1/1993 | Turner | 370/233 |
| 5,408,465 A | * | 4/1995 | Gusella et al. | 370/231 |
| 5,831,971 A | * | 11/1998 | Bonomi et al. | 370/230 |
| 5,881,313 A | * | 3/1999 | Ramakrishnan et al. | 710/40 |
| 6,028,843 A | * | 2/2000 | Delp et al. | 370/235 |
| 6,212,165 B1 | * | 4/2001 | Mann et al. | 370/231 |
| 6,615,296 B2 | * | 9/2003 | Daniel et al. | 710/57 |
| 6,680,933 B1 | * | 1/2004 | Cheesman et al. | 370/352 |
| 6,687,250 B1 | * | 2/2004 | Suzuki et al. | 370/392 |
| 6,721,325 B1 | * | 4/2004 | Duckering et al. | 370/395.4 |
| 6,768,717 B1 | * | 7/2004 | Reynolds et al. | 370/230.1 |
| 6,888,830 B1 | * | 5/2005 | Snyder II et al. | 370/392 |

(Continued)

FOREIGN PATENT DOCUMENTS

WO    WO/0074321    * 12/2000

OTHER PUBLICATIONS

Rexford et al. (Scalable architectures for integrated traffic shaping and link scheduling in high-speed ATM switches; This paper appears in: Selected Areas in Communications, IEEE Journal on Publication Date: Jun. 1997, vol. 15, Issue: 5; On pp. 938-950).*

(Continued)

*Primary Examiner*—Edan Orgad
*Assistant Examiner*—Salman Ahmed
(74) *Attorney, Agent, or Firm*—Townsend and Townsend and Crew

(57) ABSTRACT

A method and apparatus are provided for providing multiple qualities of service to different virtual network connections. In one example, the method receives a token of a cell descriptor of data traffic of a virtual network connection. It is determined whether the token is in conformance with contracted bandwidth parameters of the cell descriptor to obtain a conformance status. Based on the conformance status, one of the following steps is performed: the token is inserted into a first random access memory configured to store the token for immediate output, or the token is inserted into a second random access memory configured to store the token for non-immediate output.

30 Claims, 5 Drawing Sheets

U.S. PATENT DOCUMENTS

| | | | |
|---|---|---|---|
| 7,206,324 B2* | 4/2007 | Persson et al. | 370/466 |
| 2002/0036984 A1* | 3/2002 | Chiussi et al. | 370/232 |
| 2002/0073224 A1* | 6/2002 | Varma et al. | 709/233 |
| 2002/0110139 A1* | 8/2002 | Boura et al. | 370/432 |
| 2003/0208582 A1* | 11/2003 | Persson et al. | 709/223 |
| 2005/0201387 A1* | 9/2005 | Willis | 370/395.52 |
| 2006/0101186 A1* | 5/2006 | Lee | 710/313 |
| 2006/0159019 A1* | 7/2006 | Buskirk et al. | 370/235 |

OTHER PUBLICATIONS

Sudhir et al. Traffic descriptor mapping and traffic control for frame relay over ATM network; IEEE/ACM Transactions on Network (TON) archive vol. 6, Issue 1 (Feb. 1998) pp. 56-70 Year of Publication: 1998.*

Wen-Tsuen et al.; Traffic management for wireless ATM networks Parallel and Distributed Systems, 1998. Proceedings., 1998 International Conference on Dec. 14-16, 1998 pp. 398-405.*

* cited by examiner

CR = Current Rate

METHOD AND APPARATUS FOR MULTIPLE QUALITIES OF SERVICE TO DIFFERENT NETWORK CONNECTIONS OF A SINGLE NETWORK PATH

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

1. Field of the Invention

The present invention generally relates to quality of service on computer networks, such as the Internet. The present invention more particularly relates to providing different qualities of service to different network connections that may have different bandwidth requirements.

2. Discussion of Background

It is hard to dismiss the entrepreneurial nature of the Internet; this is no longer a research project. For most organizations connected to the global Internet, the Internet is a full-fledged business interest. Having said that, it is equally hard to dismiss the poor service quality that is frequently experienced. The rapid growth of the Internet, and increasing levels of traffic, make it difficult for Internet users to enjoy consistent and predictable end-to-end levels of service quality.

The Internet has historically offered a single level of service, that of "best effort," where all data packets are treated with equity in the network. However, we are finding that the Internet itself does not offer a single level of service quality, and some areas of the network exhibit high levels of congestion and consequently poor quality, while other areas display consistent levels of high quality service. Customers are now voicing a requirement to define a consistent service quality they wish to be provided, and network service providers are seeking ways in which to implement such a requirement. This effort is happening within the umbrella called "Quality of Service" (QoS). Examples of factors that effect QoS on the Internet include delay, bandwidth, and reliability.

Delay is the elapsed time for a packet to be passed from the sender, through the network, to the receiver. The higher the delay, the greater the stress that is placed on the transport protocol to operate efficiently. For Transfer Control Protocol (TCP), higher levels of delay imply greater amounts of data held "in transit" in the network, which in turn places stress on the counters and timers associated with the protocol. It should also be noted that TCP is a "self-clocking" protocol, where the sender's transmission rate is dynamically adjusted to the flow of signal information coming back from the receiver, via the reverse direction acknowledgments (ACK's), which notify the sender of successful reception. The greater the delay between sender and receiver, the more insensitive the feedback loop becomes, and therefore the protocol becomes more insensitive to short term dynamic changes in network load. For interactive voice and video applications, the introduction of delay causes the system to appear unresponsive.

Bandwidth is the maximal data transfer rate that can be sustained between two end points. It should be noted that this is limited not only by the physical infrastructure of the traffic path within the transit networks, which provides an upper bound to available bandwidth, but is also limited by the number of other flows which share common components of this selected end-to-end path.

Reliability is commonly considered a property of the transmission system, and in this context, it can be thought of as the average error rate of the medium. Reliability can also be a byproduct of the switching system. A poorly configured or poorly performing switching system can alter the order of packets in transit, delivering packets to the receiver in a different order than that of the original transmission by the sender, or even dropping packets through transient routing loops.

The Internet is composed of a collection of routers and transmission links. Routers receive an incoming packet, determine the next hop interface, and place the packet on the output queue for the selected interface. Transmission links have characteristics of delay, bandwidth and reliability. Poor service quality is typically encountered when the level of traffic selecting a particular hop exceeds the transmission bandwidth of the hop for an extended period time. In such cases, the router's output queues associated with the saturated transmission hop begin to fill, causing additional transit delay, until the point is reached where the queue is filled, and the router is then forced to discard packets or at least portions of packets (reduced reliability). This in turn forces adaptive flows to reduce their sending rate to minimize congestion loss, reducing the available bandwidth for the application.

Unfortunately, present methods of managing bandwidth that is available amongst a set of network connections have been inadequate, given the ever demanding transmission needs of users of the Internet.

SUMMARY OF THE INVENTION

It has been recognized that what is needed is a technique for managing bandwidth available amongst different network connections. Broadly speaking, the present invention fills this need by providing a method and apparatus for providing multiple qualities of service to different network connections of a single network path. It should be appreciated that the present invention can be implemented in numerous ways, including as a process, an apparatus, a system, a device or a method. Several inventive embodiments of the present invention are described below.

In one embodiment, a method provides multiple qualities of service to different virtual network connections. The method comprises: receiving a token of a cell descriptor of data traffic of a virtual network connection; determining whether the token is in conformance with contracted bandwidth parameters of the cell descriptor to obtain a conformance status; and based on the conformance status, performing one of inserting the token into a first random access memory configured to store the token for immediate output or inserting the token into a second random access memory configured to store the token for non-immediate output.

In another embodiment, an integrated circuit is configured to provide multiple qualities of service to different virtual network connections, the integrated circuit comprises controller circuitry configured to control operations of: receiving a token of a cell descriptor of data traffic of a virtual network connection; determining whether the token is in conformance with contracted bandwidth parameters of the cell descriptor to obtain a conformance status; and based on the conformance status, performing one of inserting the token into a first random access memory configured to store the token for immediate output or inserting the token into a second random access memory configured to store the token for non-immediate output.

Advantageously, the present invention demonstrates that high quality of service (QoS) is possible in the Internet, even with ever demanding transmission requirements. Accordingly, it has been recognized that different customers have different QoS needs. For example, Internet users requiring large bandwidth connections need a higher QoS than Internet users requiring smaller bandwidth connections. The present invention exploits these variances in needs amongst customers. The present invention makes it possible to deliver differentiated levels of best effort traffic in a manner that is predictable and fairly consistent. In practical terms, the present invention provides the ability to offer varying degrees of service levels to different customers and to different applications.

The invention encompasses other embodiments of a method, an apparatus, and a computer readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a method and apparatus for providing multiple qualities of service to different network connections of a single network path. Numerous specific details are set forth in order to provide a thorough understanding of the present invention. It will be understood, however, to one skilled in the art, that the present invention may be practiced without some or all of these specific details.

The list below provides a quick reference to acronyms used in this disclosure.

ATM—Asynchronous Transfer Mode
CB—Circular Buffer
CBR—Continuous Bit Rate
CD—CellDescriptor—the collection of fields used by the Cell Control Path to identify one cell
CID—Connection identifier—the 16 bit identifier which binds a cell to a connection between an incoming VPI/VCI and an outgoing VPI/VCI
CPU—Central Processing Unit—Management Processor which monitors and controls the SIF board and provides the interface to the network management
EBISS—Egress Backplane Interface Subsystem
EPSS—Egress Processor Subsystem
FSS—Filter Subsystem
GCRA—Generic Cell Rate Algorithm
LAT—latest arrival time
LST—latest scheduled time
MBS—maximum burst size
MTS—Main Timing Sequence—fixed length sequence of ASIC clock cycles
NPS—Next Port Sequence
NZDC—Non Zero Deferred Count
PCI—Peak Cell Interval
PCR—peak cell rate
PFS—Prioritized Fair Share—buffer management scheme applied by Discard block to non real time connections
PID—Port identifier
PR—Pointer (external) RAM
QSS—Queue Subsystem
QueueID—Queue Identifier—4 bit field priority field (0 is highest)
QID—QueueID—4 bit field priority field (0 is highest).
QoS—Quality of Service
QSS—Queue Subsystem
RdPtr—Read Pointer which obtains information from head of free list or circular buffer
SCI—Sustained Cell Interval
SCR—Schedule Correction RAM
ShapeID—shape identifier—the identifier that binds a cell to a "shape," a shape being one or more CIDs.
SIF—switch interface
SIFI—622 Mbps switch interface card
SIF2—2.4 Gbps switch interface card
SSS—Scheduling Subsystem
VCI—Virtual Channel Identifier ATM Cell Header field.
VP—Virtual Path
VPI—Virtual Path Identifier—ATM Cell Header field
VS—Virtual Source for ABR connections.

Environment

Figure 1:
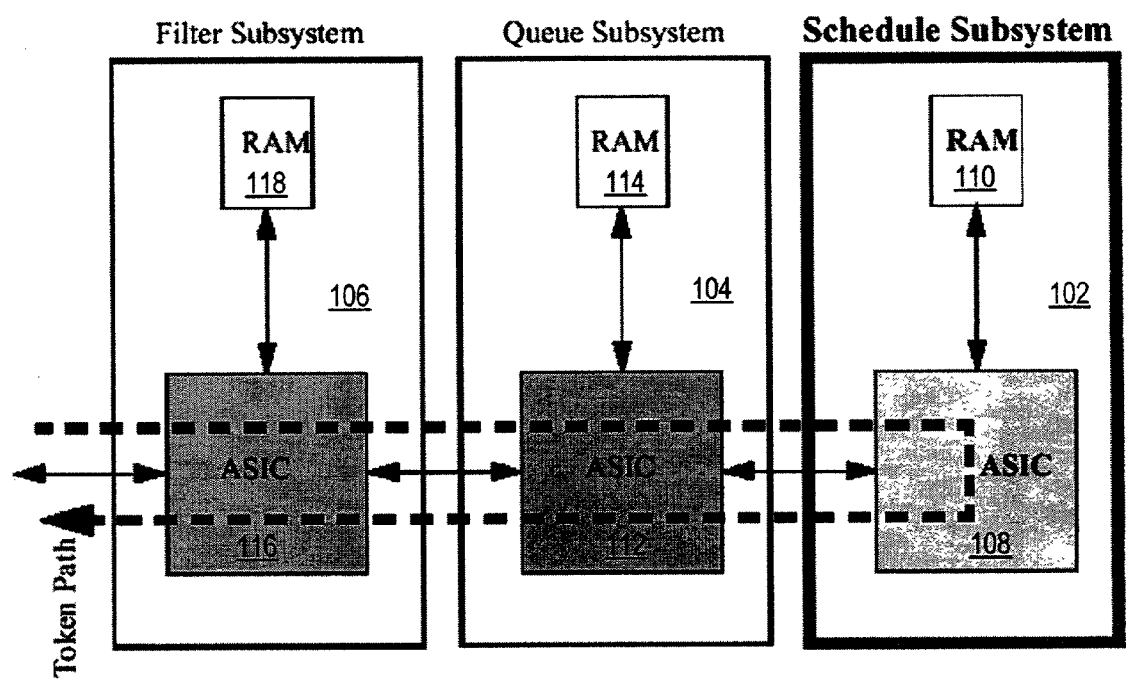
FIG. 1 illustrates the environment in which the Schedule Subsystem (SSS) 102 operates, in accordance with one embodiment of the present invention.

FIG. 1 illustrates the environment in which the Schedule Subsystem (SSS) 102 operates, in accordance with one embodiment of the present invention. Surrounding subsystems of the SSS 102 include a Queue Subsystem (QSS) 104 and a Filter Subsystem (FSS) 106. The SSS 102 includes a SSS ASIC 108 and a SSS RAM 110. The QSS 104 includes a QSS ASIC 112 and a QSS RAM 114. The FSS 106 includes a FSS ASIC 116 and a FSS RAM 118.

"Black Box" View

Figure 2:
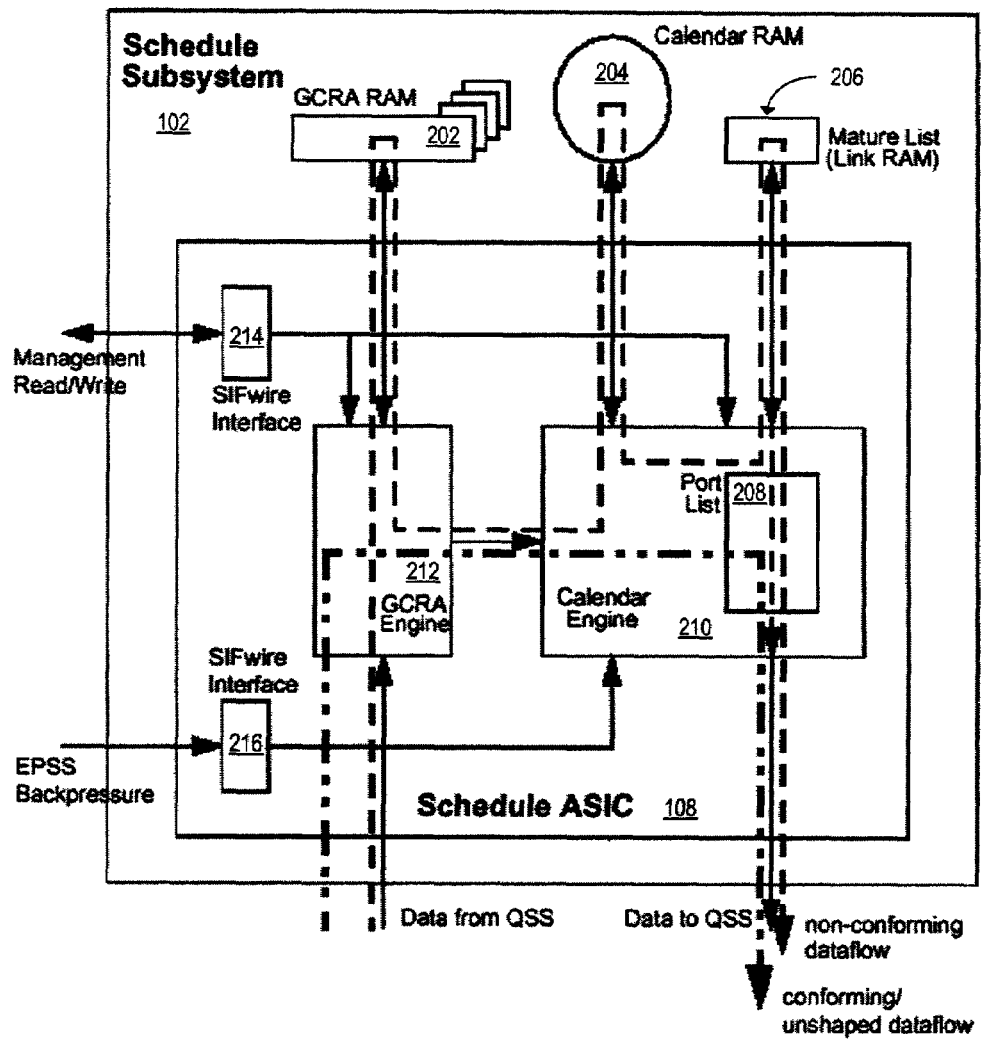
FIG. 2 illustrates flow of data through the SSS 102, in accordance with one embodiment of the present invention.

FIG. 2 illustrates flow of data through the SSS 102, in accordance with one embodiment of the present invention. The Schedule subsystem 102 includes GCRA pipeline, GCRA RAM 202, Calendar List 204, Mature List 206, Port List 208 and Sequencer. The Schedule subsystem 102 is responsible for calculating token transmission times, managing "deferred counts" of tokens that have been delayed, and for sequencing of output tokens.

The Schedule subsystem 102 inputs tokens from the Queue subsystem 104. Each token includes a ShapeID, QueueID, and a Count indicating that CDs with these characteristics have been enqueued. The Count value allows for several, identical tokens to be passed from the Queue subsystem 104 to the Schedule subsystem 102 simultaneously.

The Schedule subsystem 102 outputs tokens to the Queue subsystem 104. Each token includes ShapeID and QueueID, indicating that a CD with these characteristics is to be immediately transmitted.

The GCRA engine 212 processes tokens at up to 20/MTS (i.e., 16/MTS from the Queue subsystem 104 and 4/MTS exiting from the Port List 208). The GCRA involves determining when a cell on a given ShapeID may be outputted, based on its configured Sustained Cell Interval, Maximum Burst Size and Minimum Cell Interval. ShapeIDs for which shaping is not required have their Sustained Cell Interval set to zero.

The GCRA engine 212 returns one of three results for each token—conform, non-conform or defer. Deferral of tokens is a consequence of limiting the Calendar List 204 and Port List 208 in the SSS 102 to a single token of each ShapeID. This limits the length of Calendar List linked lists, promoting fairness, and simplifies its memory structures. Fairness is promoted since limiting both of these lists to one token of each ShapeID avoids "head-of-line blocking."

The Calendar engine 210 accepts tokens from the GCRA engine 212. Each token includes a ShapeID and PortID, along with other information. These tokens are either destined for the Calendar List 204, or are put directly into the Port List 208 if a token is conforming, or part of a non shaped stream.

The Schedule subsystem 102 outputs tokens to the Queue subsystem 104. Each token includes ShapeID and QueueID, indicating that a CD with these characteristics is to be dequeued.

The Calendar List 204 is a memory structure addressed by CurrentTime. Each time entry contains a linked list of tokens for the port to be serviced at that time. Entries are added to the Calendar List 204 by the scheduler. At the start of each MTS the CurrentTime list set is transferred to the Mature List 206.

The 262,144 times supported by the Calendar List 204 allow for Peak Cell Rates down to approximately 1/262000th the maximum port bandwidth. Thus, connections down to 2.4G/262144, or approximately 9.6 kbps can be shaped.

The Mature List 206 is an intermediate list between the Calendar List 204 and the Port List 208. Here, tokens are associated with the current highest priority QID with deferred tokens. The Mature List 206 eliminates the need for QIDs to be stored in the Calendar List 204, greatly simplifying the structure of the Calendar List 204. At a rate of 10/MTS, tokens are transferred from the Mature List 206 to the Port List 208.

The Port List 208 is a memory structure addressed by PortID and QueueID. Each entry contains a linked list of tokens awaiting immediate output to the logical port. Once again, note that no more than one token for each ShapeID is present in the Port List 208.

The sequence circuit dequeues tokens from the Port List 208 in a strict round-robin order dependent upon the configured ports. This sequence defines the rate presented to each port, so is strictly enforced. Dequeuing may be halted on a per-port basis by back-pressure signals. Selection of QueueID within each Port is determined by a configurable "preferred sequence", allowing a minimum guaranteed bandwidth to be delivered for each traffic QueueID.

ShapeID/QueueID/PortID tokens are passed back to the GCRA engine 212 from the Port List 208. If deferred tokens exist for the ShapeID, then one is selected for insertion in the Calendar List 204.

Data Structures and Flow

The data structures maintained by the Schedule subsystem 102 and the flow of data through the SSS 102 are provided. The data structures include a table which holds GCRA parameters and scheduling information, a Calendar List 204 which holds scheduled tokens, a Mature List 206 which holds tokens that have left the Calendar List 204 to be inserted into the Port List 208, a Port List 208 which holds tokens awaiting dequeueing, Port and Queue sequence RAMS and a Schedule Correction RAM (SCR).

The SSS 102 has two SIFwire interfaces which facilitate configuration and monitoring of the SSS, as well as supplying per port backpressure to the Port Sequencer.

The GCRA RAM 202 holds both GCRA parameters and scheduling information. As each token arrives at the SSS 102, the token is placed into the GCRA engine 212. When tokens emerge from the output of the GCRA engine 212, the SSS 102 has determined that the token is either: conforming, where the token is sent to the Port List for immediate output; non-conforming, where the token is sent to the Calendar engine to be added to the Calendar List; or to be deferred, where the token will be passed to the Calendar engine 210 to be added to the Calendar List 204 at some time in the future.

Tokens passed to the Calendar engine 210 are either non-conforming and are inserted into the Calendar List 204, or are conforming or unshaped and are immediately inserted into the Port List 208. Non-conforming tokens are effectively scheduled to be inserted into the Port List 208 at some time in the future. When that time arrives, the tokens are then transferred into the Mature List 206, to be later transferred to the Port List 208. At this point, the SSS 102 examines its deferred counts to determine the highest priority token so that the SSS 102 assigns the corresponding QID to the token going from the Mature List 206 to the Port List 208. The Mature List 206 is necessary because QIDs are not maintained in the Calendar List 204.

The general dataflow, shown by the thin dotted line in FIG. 2, refers to the longest data path through the SSS 102. This path is traversed by non-conforming tokens and takes the token from the QSS interface, in and out of the GCRA RAM 202, in and out of the Calendar List 204, into the Mature List 206 and then into the Port List 208, and out to the QSS 104. The shortest path, shown by the thick dotted line in FIG. 2, is traversed by conforming tokens, or non-shaped tokens. This path takes a token directly from the QSS 104 interface into the Port List 208, and out to the QSS 104.

Four tokens per MTS arrive at the GCRA engine 212 from the Port List 208. These tokens are those that are to be passed to the QSS 104 to be transmitted. If any tokens from the shapes of the cells that have left the Port List 208 exist in the deferred counts, then tokens for these shapes are passed to the Calendar engine 210 for insertion into the Calendar List 204, and the corresponding deferred count value is decremented.

Schedule Subsystem Tokens

Tokens coming from the Queue Subsystem 104 have 3 fields: ShapeID, QueueID and a replication count. The PortID is not part of the token arriving at the SSS 102, it is instead kept in the GCRA RAM 202 and is retrieved using the ShapeID. The replication count allows the Queue Subsystem 102 to pass multiple tokens on the same connection using a single token. This is used when the Queue Subsystem 102 is dealing with packets. Tokens going to the Queue Subsystem have 2 fields: ShapeID and QID.

Scheduling Algorithm

The scheduling algorithm is provided. The scheduling algorithm is most preferably applied to connections or shapes whose bandwidth is 622 Mbps or less. Support for logical ports (see the "Scheduling for greater than 622 Mbps" section below) is intended to offer simple PCR type shaping for connections whose bandwidth is greater than 622 Mbps.

The Scheduling Algorithm is used to determine whether connections are adhering to their contracts. An important aspect of the Scheduling Algorithm is that it is based on a Generic Cell Rate Algorithm (GCRA).

Figure 3:
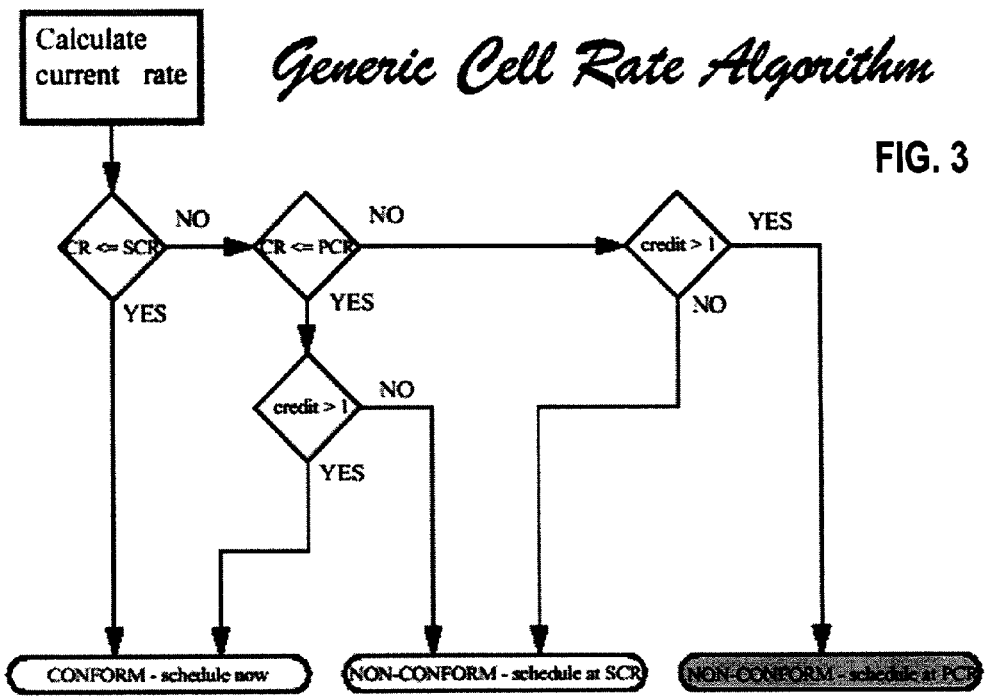
FIG. 3 is a flowchart of the GCRA, in accordance with one embodiment of the present invention.

FIG. 3 is a flowchart of the GCRA, in accordance with one embodiment of the present invention. The GCRA determines the time at which the next cell for a given shape can be transmitted, and is executed whenever a cell is received. If that time coincides with the current time, then the cell is put into the Port List 208 for immediate output back to the QSS 104. Otherwise, the cell is delayed until the time calculated. Table 1 below shows example definitions for the GCRA. Table 2 below shows example pseudo code for the GCRA.

TABLE 1

Example Definitions for the GCRA

| | |
|---|---|
| Now | = Current time |
| LastSchedTime | = Last time a cell on the current shape was scheduled |
| SchedTime | = The time at which this cell can be transmitted |
| LastArrivalTime | = Time at which the previous cell arrived |
| MBS | = Maximum burst size |
| PCI | = Peak cell interval |
| SCI | = Sustainable cell interval |
| Credit | = Number of cells that can be xmitted in a burst at a rate R where: R > SCR and R <=PCR |

TABLE 2

Example Pseudo Code for the GCRA

```
ElapsedTime :=Now - LastArrivalTime;
Credit :=Credit + ElapsedTime;
if (Credit>(MBS * SCI)) then
    Credit MBS * SCI;
end if;
if (SomethingScheduled(ShapeID)) then
    -- We must defer this token.
    if (Credit>SCI) then
        -- We haven't exceeded MBS. Schedule at PCR.
        SchedTime :=LastSchedTime + PCI;
    else
        -- Schedule at SCR.
```

TABLE 2-continued

Example Pseudo Code for the GCRA

```
        SchedTime :=LastScheduledTime + SCI;
    end if;
else
    if (ElapsedTime<SCI) then
        -- we've received a cell xmitted at a rate
        -- greater than SCR
        if (ElapsedTime<PCI) then
            -- Violation of PCR. We now have to decide
            -- If we have sufficient credit to shape
            -- to PCR.
            if (Credit>SCI) then
                -- We can shape this token to PCR
                SchedTime :=LastSchedTime + PCI;
            else
                -- We must shape to SCR
                SchedTime :=LastSchedTime + SCI;
            end if;
        else
            -- Do we have sufficient credit to transmit
            -- this cell at PCR.
            if (Credit>SCI) then
                SchedTime :=Now;
            else
                -- We've violated MBS. We must shape to SCR.
                SchedTime :=LastSchedTime + SCI; end if;
        end if;
    else
        -- We have received a cell xmitted at SCR or lower.
        -- Conform.
        SchedTime : Now;
    end if;
end if;
LastSchedTime :=SchedTime;
LastArrivalTime :=Now;
Credit :=Credit - SCI;
```

Figure 4:
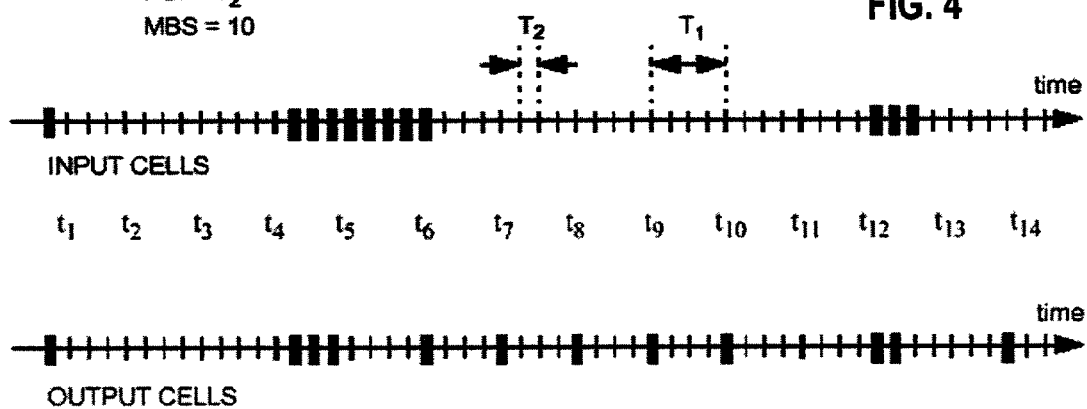
FIG. 4 illustrates shaping characteristics of the GCRA, in accordance with one embodiment of the present invention.

FIG. 4 illustrates shaping characteristics of the GCRA, in accordance with one embodiment of the present invention. The arrival of cells is depicted on the top time line, and their departure on the bottom. A burst of 8 cells arrives at about time $t_4$, but only three of these cells depart the shaper as that connection has only built up enough credit to transmit 3 cells. The remaining 5 cells in the burst come out at spaced at SCI. Another burst of 3 cells arrives at about time $t_{12}$, at which time this connection only has enough credit to transmit 2 of these cells, the remaining cell is delayed by SCI.

Scheduling for Greater than 622 Mbps

External RAM latencies mean that full PCR/SCR/MBS shaping of connections or shapes at rates above 622 Mbps is not possible in the preferred embodiment. So that some form of shaping can be performed on shapes at rates above 622 Mbps, the idea of "logical ports" is used. By mapping a shape whose rate is above 622 Mbps to a logical port, only used by that connection, by means of the Port Sequence, the amount of bandwidth allocated to that shape can be controlled. See the "Sequencing" section below for a more discussion on the Port Sequence.

Conformity

If a token is conforming with respect to its contract, then that token is immediately scheduled for output to the QSS 104 and put into the Port List 208, if that connection does not already have a token waiting in the Port List 208. If that connection does already have a token waiting in the Port List 208, then a deferred count value is incremented for that connection. If a token is not conforming, then the token must be delayed until such time that the token is conforming. Delaying a token can be done in one of two ways. One, the token has to be added to the Calendar List. Or two, if the shape to which that token belongs already has a token in either the Calendar List 204 or Port List 208, one of the counts corresponding to the token's ShapeID/QID is incremented. These count values are called the "deferred" counts. The deferred count values are maintained by the GCRA engine 210, and are held in the GCRA RAM 202. See the "GCRA RAM" section for more discussion on the GCRA RAM 202.

All tokens not consumed into the deferred counts are passed to the Calendar engine with a flag indicating whether they are conforming. The Calendar engine then processes these tokens accordingly.

Time Wrap and Inactive Connections

Because time in the SSS 102 is represented by a finite number of bits (e.g., 28 bits), the time counter will often reach its maximum value and then wrap around back to zero. This situation complicates relative time calculations. There are two primary problems—dealing with negative time differences, and correctly handling shapes which have not seen any activity in a time greater than the maximum time value.

For purposes of later discussion, TIME_MAX is defined to be the amount of time represented by the number of bits in the time counter. In the SSS 103, the time counter is preferably 28 bits, so TIME_MAX has the value $2^{28}-1$. The unit for time is a quarter MTS.

Inactive Connections

Once a connection has been inactive for a period of time greater than TIME_MAX, the shaper cannot tell how many times the time counter may have wrapped around while the connection has been inactive. To avoid this situation the SSS 102 has a "sweeper" circuit which systematically examines the state information for each shape, looking for connections that have been inactive for a long period. In one embodiment, this period is defined to be:

PERIOD:=SCI✗64;—SCI is sustained Cell Interval.

Once a connection has been inactive for PERIOD, the sweeper updates that connection's state information, in particular its Last Arrival Time (LAT) value, and its credit. Once this limit is reached, LAT is updated to be the current time, and PERIOD is added to that connection's credit value. This sweeper ensures that calculated time differences for a connection are always less than TIME_MAX.

One of the 32K shapes is "swept" every MTS. All 32K shapes can be swept well within the sustained cell interval of the slowest connection supported by the shaper, 9.6 Kbps.

Negative Time Differences

Every time a new cell arrives at the SSS 102, the shaper determines how long it has been since a cell on this shape last arrived. This calculation involves a subtraction, and if time has wrapped around to zero in the interim, this time difference will be negative. The shaper knows that this can happen, and employs the algorithm in Table 3 below to combat the problem.

TABLE 3

Example of Algorithm To Combat The Problem Of
Negative Time Difference Between Cell Arrivals procedure TIME_TIME_DIF(TIME1 : in TIME T;
                     TIME1 : in TIME T;
                     DIFF : out TIME_T) is
begin
   if TIME2>TIME1 then
      -- The time difference is negative.
      DIFF :=TIME_MAX + TIME1 - TIME2;
   else
      DIFF :=TIME1 - TIME2;
   end if;
end TIME_DIFF;

The algorithm of Table 3 works because the inactive connection sweeper ensures that the difference between current system time and last arrival is always less than TIME_MAX.

Per Queue ID Deferred Counts

The GCRA engine 212 also maintains a per-QID deferred count value, together with a per shape deferred count value. The per shape value is the number of tokens to be scheduled at PCR, while the per QID count is the total number of deferred tokens for that shape. When a token arrives at the GCRA engine 212 and is determined to be non conforming, one or both of the deferred count values needs to be incremented. The GCRA algorithm proposed in the "Scheduling Algorithm" section above determines which count value(s) need incrementing. If the per QID count value is zero prior to incrementing either the deferred count values, this indicates that there are no tokens for that shape in the system, and a token can be added into the Calendar List 204. A token is passed to the scheduler for insertion into the Calendar List 204. If the per QID count value is non zero then no token is passed to the scheduler.

When more than one token from a particular shape has been scheduled (i.e., the per QID count value is greater than one), scheduled tokens for a particular shape need to be transferred from the deferred count lists into the Calendar List 204 when tokens from that shape leave the Port List 208. Four times every MTS a token exits the Schedule subsystem 102. Each of these exiting tokens are examined. If either deferred count values for the exiting token is greater than one, then there are tokens waiting to be transferred into the Calendar List 204. This being the case the GCRA engine 210 will pass a token marked as non conforming to the Calendar engine 210, and decrement the appropriate deferred count value(s) by one. That is, if the per shape PCI count value is greater than zero, both count values are decremented, and a token is scheduled at PCR. If it is zero, only the per QID count value is decremented and the token is scheduled at SCR.

The per QID count value parameter is also used for non-shaped streams. A requirement of the SSS 102 is that only one token per shape is present in the Port List 208, Calendar List 210 or Mature List 206 at any one time. This means that if a token for a non-shaped stream arrives, and a token for that stream is already present in the Port List 208, that token must be deferred until the token currently in the Port List 208 is output to the QSS 102.

Transferring Tokens from Deferred Counts to the Calendar List

Tokens from both shaped and unshaped connections are held in the deferred counts, in the GCRA RAM 202. The treatment of these two categories of deferred counts is slightly different.

Shaped Connections

Four times per MTS, a token is removed from the Port List 208 for output to the QSS 104. It is at this point that tokens stored in the deferred counts are transferred into the Calendar List 204, from the same shape as the tokens being removed from the Port List 208. This ensures that all tokens in the Calendar List 204 and Port List 208 have unique SIDs.

Unshaped Connections

The procedure for transferring tokens out of the deferred counts for unshaped connections is the same as that for shaped connections, except that tokens are transferred directly to the Port List 208, rather than the Calendar List 204.

With the use of deferred counts to keep track of cells yet to be transmitted, it is possible for cells on one connection that arrive after cells that arrive on another connection, to leave the SSS 102 before the other cells. Consider, for example, a case in which ShapeID=15 has 100 cells arrive very quickly, then Shap.eID=17 has one cell arrive. Both shapes are unshaped. The cell on ShapeID=17 will depart before most of the cells on ShapeID=15. This is because the cells on ShapeID=15 have to be bled out of the deferred counts at a maximum rate of 4/MTS, whereas the sole ShapeID=17 cell will go straight into the Port List 208 and be transmitted.

GCRA RAM

The task of the GCRA engine 212 is to perform the GCRA, and to manage the GCRA RAM 202, which contains parameters necessary for implementing the GCRA algorithm, as well as the deferred count values. The parameters SCI, PCI, MBS, LS T, LAT and credit used in the GCRA algorithm are stored in the GCRA RAM 202 per ShapeID. The deferred count values are stored per ShapeID/QueueID. The GCRA RAM 202 is indexed using both the ShapeID and QID, which means that the GCRA parameters are aliased across all queue entries for a particular shape. The GCRA RAM 202 also contains the QID for each ShapeID. If no shaping is required on a particular ShapeID then its SCI parameter is set to zero. The format of each word in GCRA RAM 202 is shown in Table 4 below.

The parameters above marked in bold are those that management software must set when configuring a new connection.

One problem that the GCRA engine 212 needs to be aware of is that many cells from a particular shape may be presented to it during any given MTS. This means that in order to process cells other that the first in a set from the same shape, the GCRA parameters and deferred count values used must be those modified by calculations for cells during the current MTS and not those present in the GCRA RAM 202.

Deferred Count RAM

A count of the number of tokens present in the Scheduler per ShapeID/QID is kept in a separate external RAM. All SIDs in the Scheduler are unique. So, as tokens on a particular ShapeID/QID continue to arrive, the tokens are effectively deferred by increasing the appropriate deferred count value. As tokens exit the Scheduler, a new token on that ShapeID/QID enters the Scheduler if its deferred count is non zero. In theory all tokens in the cell buffer could be on the same ShapeID/QID, so each deferred count value must be able to cope with this, requiring this count to be a 20 bit integer. The Deferred Count RAM has a data width of 20 bits (plus parity), and an address width of 19 bits (15 bits of ShapeID, and 4 bits of QID).

Calendar List Management

The Scheduling algorithm is provided. The insertion of Shape IDs into, the Calendar List 204 is also provided.

Non conforming tokens need to be scheduled for release at some later time, so that the output of tokens from the scheduler conforms to the agreed contract. Shape IDs are stored in one of two places the Calendar List 204 or the GCRA RAM 202 as a deferred count.

The first scheduled token from a particular shape is stored in the Calendar List 204. Subsequent tokens from a particular shape are stored in the GCRA RAM 202 by incrementing the deferred count for that shape.

When a token arrives at the GCRA engine 212, the GCRA RAM 202 parameters for that token are read, including the deferred counts. If the deferred count parameters are zero, then the Calendar List 204 contains no entry for the current token, and the current non-conforming token can have an entry placed directly into the Calendar List 204. If the count is nonzero, the Calendar List 204 already has an entry for the current token. In this case, the Deferred Count parameter for the current token is incremented and written back to the GCRA RAM 202. When a token is passed from the GCRA

TABLE 4

Example Format for a Word in GCRA RAM 202

```
type GCRA_RAM_WORD_FORMAT is
    record
        --   Name        Type                        Units      Comment
             PID       : unsigned(3 downto 0);    -- N/A        Port ID
             PCI       : unsigned(22 downto 0);      QMTS       Peak Cell Int.
             SCI       : unsigned(22 downto 0);      QMT        Sust. Cell Int.
             MBS       : unsigned(7 downto 0);       Cells      Max Burst Size
             CREDIT    : unsigned(27 downto 0);   -- QMTS       Time Credit
             LST       : unsigned(23 downto 0);   -- QMTS       Last Sched. Time
             LAT       : unsigned(27 downto 0);   -- QMTS       Last Arrival Time
             NZDC      : unsigned(15 downto 0);   -- N/A        Non Zero Deferred Counts
end record;
type GCRA_RAM is array (0 to (2** 19) 1) of GCRA RAM WORD FORMAT;
``` engine 212, a "schedule time" parameter is also passed, which tells the Calendar engine 210 where in the Calendar List 204 to put that token. This time parameter, however, may not be exactly right, and the Calendar engine 210 may have to make a correction to that time value. See the "Scheduling with respect to Port Sequence" section below for more discussion on Scheduling.

Each time slot in the Calendar List 204 is associated to the four ports that will be serviced at that time, as defined in the port sequence. See "Normal Port Sequencing" section below for more discussion on sequencing. For each of these four ports, a list of tokens is maintained. Because each time slot is associated with four ports in the port sequence, no record of PIDs need be kept in the Calendar List, nor any record of QID. Therefore, it is crucial that tokens destined for a particular port be put in exactly the right location in the Calendar List 204.

Calendar List RAM Format

Figure 5:
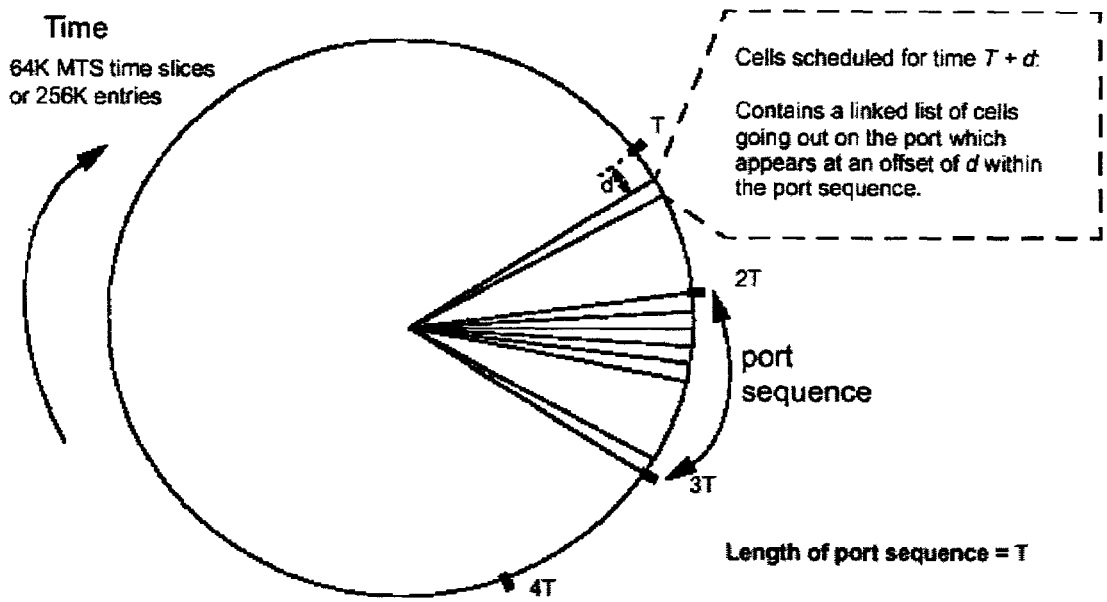
FIG. 5 shows a circular time diagram of the timing sequence of data cells flowing through the Calendar List 204, in accordance with one embodiment of the present invention.

FIG. 5 shows a circular time diagram of the timing sequence of data cells flowing through the Calendar List 204, in accordance with one embodiment of the present invention. Each entry in the Calendar List 202 holds lists of cells scheduled for output at a particular MTS. Each entry in the Calendar RAM 204 holds a set of lists for each of the four ports scheduled to be serviced at that time by the pre-determined port sequence. A list is represented by a 15-bit head and 15-bit tail pointer. Table 5 below shows an example of how such a list may be defined.

The SSS 102 has an internal RAM which is indexed by port identifier and position within the port sequence. This RAM returns the position of the nearest entry in the port sequence for the requested port given the current position within the port sequence. In other words, for every entry in the port sequence, there are 16 corresponding entries which indicate the location of the nearest entry of that port from the current position.

The SCR also holds the NPS bit (Next Port Sequence). For entries close to the end of the port sequence, the next, nearest entry for a particular port may be back at the top of the sequence, that is, in the following port sequence. In this case we must increment the part of the Calendar RAM address which references which port sequence we are in. The Calendar RAM 204 contains 256K entries. The port sequence has 64 entries, which means that the Calendar RAM 204 holds 4K full port sequences, so we can consider the most significant 12 bits of the Calendar RAM address as a reference to an entire port sequence. The least significant 6 bits of the Calendar RAM address then become the position within a given port sequence.

Schedule Correction RAM

The SCR is a lookup table which enables the Calendar engine to make corrections to the time parameter passed to it from the GCRA engine 212. The table is indexed using two parameters—a port sequence position, and a PID. This table returns the next nearest position in the port sequence allocated to a particular port, given a position in that port sequence. Table 6 below is an example organization of the SCR.

TABLE 5

Example Pseudo-Code Defining A Calendar List

```
type_HEAD_TAIL is
    record
        HEAD : unsigned(14 downto 0);
        TAIL: unsigned(14 downto 0);
    end record;
type CALENDAR_LIST_WORD_FORMAT is
record
    PORT: HEAD TAIL;
    end record;
type CALENDAR RAM is array (0 to (2**18) − 1) of CALENDAR LIST WORD FORMAT;
```

Scheduling With Respect To Port Sequence

In any given MTS, only four ports can be serviced. Each entry in the Calendar List 204 has a Port List 208 associated with it. Which ports are associated with which time slots is determined by the port sequence. When a token is scheduled for some time slot in the future, the port sequence must be observed. That is, when a time value is calculated by the GCRA engine 212 for insertion into the Calendar List 204, the actual time value used will be the one closest to, in advance of, the calculated value, assigned to the port of the token in question.

Figure 6:
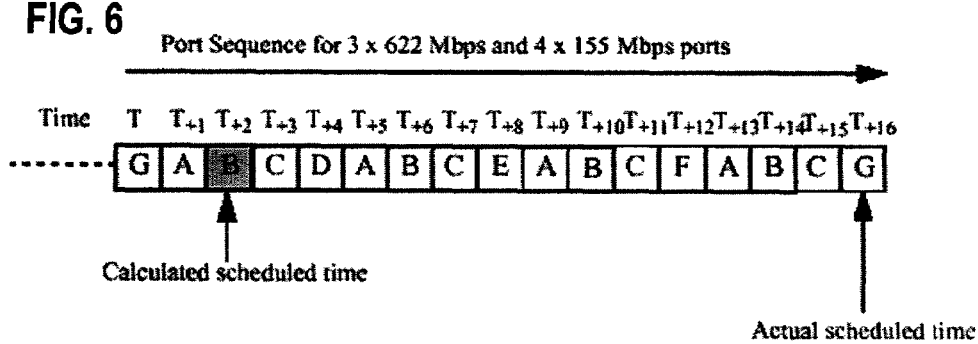
FIG. 6 is a diagram illustrating scheduling according to port sequence, in accordance with one embodiment of the present invention.

FIG. 6 is a diagram illustrating scheduling according to port sequence, in accordance with one embodiment of the present invention. As an example, assume there are 3×622 Mbps (A, B and C) and 4×155 Mbps (D, E, F and G) ports on a SIR. A non-conforming cell targeted for Port G is received. It is calculated that the next token should be scheduled at time $T_{+2}$, but taking the port sequence into account, the token for port G is actually scheduled at time $T_{+16}$.

This "correction" of scheduled time allowing for port sequence is achieved by performing a RAM lookup. This RAM is called the "Schedule Correction RAM," or SCR.

TABLE 6

Example Pseudo-Code Defining Organization of the Schedule Correction RAM

```
type SCR_RECORD is
    record
        NEXT NEAREST    :unsigned(5 downto 0);
        NPS             :std logic;
    end record;
type SCR_ARRAY is array (0 to 63) of SCR_RECORD;
type SCR is array (0 to 15) of SCR_ARRAY;
```

Figure 7:
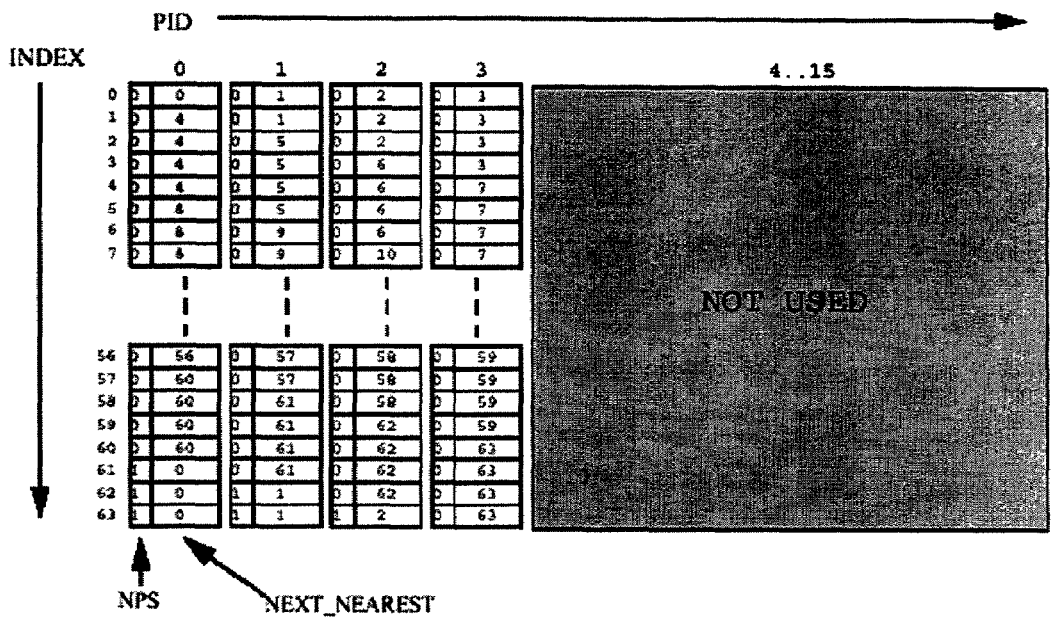
FIG. 7 is a diagram showing the schedule correlation RAM contents, in accordance with one embodiment of the present invention.

FIG. 7 is a diagram showing the SCR contents, in accordance with one embodiment of the present invention. As an example, consider the simple case of an LIM having 4×622 Mbs ports (0, 1, 2 and 3). The port sequence would be 0, 1, 2, 3, 0, 1, 2, 3, . . . The SCR contents would be as shown in FIG. 7.

Mature List

Tokens held in the Calendar List 204 are tokens which have been scheduled for insertion into the Port List 208 at some time in the future. When that time arrives those tokens are first transferred into the Mature List 206 before being transferred to the Port List 208. This intermediate step is required because the Calendar List 204 maintains no record of QID. Holding tokens temporarily in the Mature List 206 allows the SSS 102 to associate each of the tokens exiting the Calendar List 204 with a QID, and more importantly, the highest QID at the time. Because each token in the Mature List 206 must be dealt with one at a time, the rate at which tokens can be transferred from the Mature List 206 to the Port List 208 is limited to 4 tokens/MTS—a rate of 2.4 Gbps. Because this is equal to the maximum SIF2 bandwidth of 2.4 Gbps, ports are guaranteed to be serviced at their maximum rate. Leaving the association of QID with the token to the very last opportunity means that the higher priority tokens wont be blocked while lower priority tokens are sitting in the Calendar List 204.

The limited rate of tokens out of the Mature List 206 does introduce a problem—inter-shape head of line blocking. Because the Mature List 206 is an unsorted list of tokens for each port, and the SSS 102 cannot guarantee that the Lists will be emptied each MTS, lower priority traffic on a shape may block higher priority traffic on another shape. This blocking only occurs in the Mature List 206 when the rate of unique tokens coming out of the Calendar List 204 is in excess of 6 Gbps.

NZDC Bitmap

To enable the Calendar engine 210 to identify the highest priority QID with deferred tokens, when extracting tokens from the Mature List 206, a 16-bit "bitmap" is maintained per shape indicating which QIDs have deferred tokens. Each bit in this bitmap represents the state of the deferred counts for each of the 16 QID counters per shape. If a bit is set to '1' then the corresponding QID deferred count is non zero. These per-shape bitmaps are held in the GCRA RAM.

Sequencing

The sequences block within the SSS 102 is responsible for retrieving four tokens from the Port List 208 per MTS and sending them to the Queue subsystem 104. Within the Sequences there are two sequencing mechanisms at play. First, there is a sequence describing the order in which the ports are serviced. Second, there is a preferred sequence for servicing the different Queue IDs for each port. Both of these sequences are programmable.

The Port List 208 itself is a collection of linked lists, indexed by Port ID and Queue ID. There are 16 Port IDs and 16 Queue IDs which mean the Port List 208 contains head/tail pairs for 256 lists. These head/tail pairs are kept in internal RAM.

The sequences simply traverses the various lists according to the defined sequences extracting four tokens per main timing sequence. These four tokens are also fed back to the GCRA engine 202 so that it can update its calendar and deferred count lists.

Normal Port Sequencing

The sequence in which ports are serviced depends on the speeds of the various ports. The sequences provide a 64 entry RAM for specifying the port sequence, where each entry in that RAM is a port identifier. The sequences reads a port identifier from the port sequence RAM each quarter MTS, simply cycling through the RAM incrementing the address in each MTS four times.

Logical Port Sequencing

When the Logical Port Mode (LPM) bit in the control register is set, all PIDs appearing in the Port Sequence are Logical Ports. In this mode of operation there is only actually one physical port (PID=0), i.e. OC48. The use of the logical ports is intended to allow simple, PCR type shaping of shapes above rates of 622 Mbps. The existence of shapes above 622 Mbps implies configuration of a single OC48 port, and hence the use of a single, fixed physical PID (of zero) when in Logical Port Mode.

Preferred Queue Sequence

Once the sequences have decided which port will be serviced in a MTS, the queue to service must be decided. The order in which to service queues is defined in a preferred queue sequence RAM. Each port has an associated preferred queue sequence. This preferred queue sequence allows for sequencing of queues other than by their inherent queue priorities. The preferred queue sequence algorithm is shown below in Table 7.

TABLE 7

Example Pseudo-Code of Queue Sequence Algorithm

```
PrefQID      :=QIDLookup(PID, SequenceCount(PID));
PrefPriority :=PriorityLookup(PID, SequenceCount(PID));
HighQID             .:=HighestPriorityNotEmptyQueue (PID);
HighPriority :=Priority(HighQID);
if (PrefPriority >=HighPriority) then
    -- Preferred QID has priority
    if (QueueNotEmpty(PrefQID)) then
                SelectedQueue :=PrefQID;
    else
                SelectedQueue :=HighQID;
    end if;
else
    SelectedQueue :=HighQID;
end if;
```

Port "Back Pressure"

Per-port back-pressure is provided to the sequencer via a SIFwire interface, identifying ports that are experiencing congestion. When the sequencer receives back pressure for a particular port, that port is then skipped when it is selected from the port sequence, and nothing for that port is transmitted during the MTS in which the port was skipped. That port will continue to be skipped whenever it appears in the port sequence until the back-pressure is removed. The result is that holes in the cell flow on the output of the schedule subsystem appear.

Link RAM

The Calendar List 204 only ever contains one token per Shape ID, and because the Calendar List 204 is only updated when tokens leave the Port List 208, all tokens in the Calendar List 204 and Port List 208 are unique. This means that the tokens for the Calendar List 204, Port List 208 and Mature List 206 may be kept in a single RAM called the "Link RAM." This RAM holds SIDs, where each ShapeID is used as the pointer to the next ShapeID in the list. This works because all SIDS in the Link RAM are unique, eliminating aliasing. Because the SIDs are stored in the Link RAM, the Calendar List 204, Port List 208 and Mature List 206 need only contain HEAD/TAIL pointer pairs (into the Link RAM) for the various lists they manage.

Figure 8:
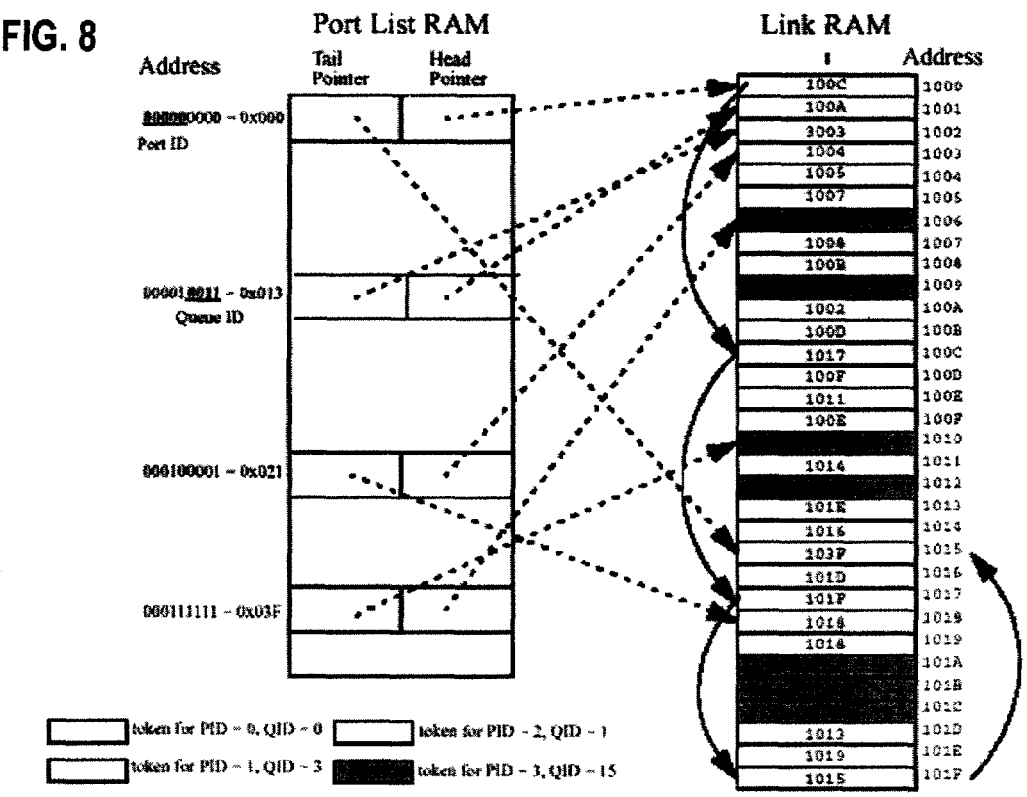
FIG. 8 is a schematic diagram showing the operation of the Port List and Link RAM, in accordance with one embodiment of the present invention.

FIG. 8 is a schematic diagram showing the operation of the Port List and Link RAM, in accordance with one embodiment of the present invention. Table 8 below shows an example of pseudo code that defines a Link RAM.

TABLE 8

Example Pseudo-Code Defining a Link RAM

```
type LINK_RAM_WORD_FORMAT is
    record
        NEXT          :unsigned(14 downto 0); -- This is an ShapeID
        HIGH_QID      :unsigned (3 downto 0);
    end record;
type LINK RAM is array (0 to (2**32) - 1) of LINK RAM WORD FORMAT;
```

Probe Test

The schedule subsystem (SSS) 102 has a "probing" function that allows the user to gather detailed information.

The SSS 102 provides a set of counters that count various statistics on either a per ShapeID or per PID basis. Probes consist of the counters themselves and the Probe ID register, which identifies which PID or ShapeID is to be tracked.

Whenever a new PID or ShapeID is written into the Probe ID register, the counters are reset to zero.

The Tokens Received Counter is a per ShapeID counter that tracks the number of tokens received on the requested ShapeID. Note that this tokens counter does not take into account the "replication count" field in the QSS/SSS token, and as such this counter does not reflect the number of cells corresponding to the tokens received by the SSS 102.

The Tokens Transmitted Counter is a per ShapeID counter that tracks the number of tokens transmitted by the SSS 102. This counter also reflects the number of cells corresponding to the tokens transmitted.

The Port List Occupancy Counter is a per PID counter that counts how many tokens are currently waiting to go out on the named Port.

The Peak Port List Occupancy is a "high water mark" for the Port List Occupancy.

The Conforming Tokens counter is a per ShapeID counter that counts how many conforming tokens are received on the indicated ShapeID.

Port Sequence Aware Shaping

The shaper only schedules tokens at times which correspond to the token's port being serviced. This means PID does not have to be tracked in the various data structures holding scheduled tokens, making them considerably smaller.

In the past, per PID lists were kept for each time slot in the shaper's calendar, making it large. With port sequence aware shaping, each time slot only holds tokens for a particular port, significantly reducing the amount of storage space required for scheduled tokens.

Also note that this is of course a multi port shaper, as well as being multi-priority (QID) and multi connection (ShapeID).

The multi-port facility is "built in" such that data structures are minimized (as described above) and such that unwelcome inter-port interactions are avoided.

Deferral of Assigning QID to Avoid Head-of-Line Blocking

When tokens are scheduled for later transmission, and placed into the calendar, the QID corresponding to the token is not written into the calendar along with the token. When tokens are scheduled, a per-ShapeID bitmap representing all the active QIDs on that shape is recorded. When tokens emerge from the calendar, they are placed in a list [mature list]. Here they are reassigned a QID, corresponding to the highest quality of service QID_currently_awaiting_transmission for that shape, in contrast to the highest waiting when the token entered the calendar.

An example to illustrate how it works [lower QID representing higher quality of service]:
token1: ShapeID=10 QID=7 arrives at time 1000 ns
token2: ShapeID=10 QID=0 arrives at time 2000 ns In this example above, token2 will emerge from the shaper before token1, which is desirable since it should receive a higher quality of service. If the assignment of QIDs was not deferred, but was placed in the calendar along with the token, then token1 would emerge from the shaper first. In this case, lower priority traffic could effectively delay higher priority traffic.

Sweeping of Shaper RAM

One of the problems a shaper must deal with is the wrap around of its time counters. When tokens arrive at the shaper, it must determine how much time has elapsed since the last token on that shape was seen in order to determine whether or not it is conforming to its shaping parameters. This is done by subtracting the shapes LAST_ARRIVAL_TIME from the CURRENT_TIME. A problem arises when a long time elapses between consecutive tokens on a shape, in which time the CURRENT_TIME counter may have wrapped around, thus making the simple subtract above invalid. The approach taken in the shaper is that once in every main timing sequence a shape is "swept". This entails looking at the LAST_ARRIVAL_TIME for the shape being swept, and if the difference between it and CURRENT_TIME is above a threshold, then the LAST_ARRIVAL_TIME is updated to CURRENT_TIME, and the shape's credit parameter is updated accordingly. This ensures there are never wrap around problems when executing the above time calculations.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMS, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, receiving a token of a cell descriptor of data traffic of a virtual network connection, determining whether the token is in conformance with contracted bandwidth parameters of the cell descriptor to obtain a conformance status, inserting the token into a first random access memory configured to store the token for immediate output, and inserting the token into a second random access memory configured to store the token for non immediate output, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing multiple qualities of service to different virtual network connections, the method comprising:
    receiving a token of a cell descriptor of data traffic of a virtual network connection, the token including an identifier corresponding to contracted bandwidth parameters of the cell descriptor;
    determining whether the token is in conformance with the contracted bandwidth parameters of the cell descriptor to obtain a conformance status;
    inserting the token into a first random access memory configured to store the token for immediate output if the conformance status has a first value and a token with the same identifier has not been stored in the first memory;
    inserting the token into a second random access memory configured to store the token for non-immediate output if the conformance status does not have the first value and a token with the same identifier has not been stored in the second memory;
    otherwise, deferring the token by inserting it into a third random access memory, wherein deferring the token further comprises updating a count corresponding to the identifier of the deferred token;
    replacing tokens removed from said first or second memory with deferred tokens from the third memory having the same identifier as the removed tokens until the count corresponding to said same identifier has a predetermined value, wherein said count is undated each time a removed token is replaced with a deferred token.

2. The method of claim 1, wherein the step of inserting the token into the first random access memory comprises storing the token in a port list, and wherein the step of inserting the token into the second random access memory comprises storing the token in a calendar list.

3. The method of claim 1, wherein the data traffic includes different virtual network connections transmitted on a single virtual network path.

4. The method of claim 1, wherein the token is configured to indicate that the cell descriptor has characteristics including at least one of:
    a particular shape identification configured to establish bandwidth parameters of the cell descriptor;
    a particular queue identification configured to indicate a relative priority level of the cell descriptor; and
    a particular count configured to indicate a number of identical transmit tokens to be transmitted simulianeously.

5. The method of claim 1, wherein the step of receiving the token of the cell descriptor comprises inputting the token into a generic cell rate algorithm engine, and wherein the step of determining whether the token is in conformance is controlled by the generic cell rate algorithm engine.

6. The method of claim 1, wherein the conformance status is one of:
    conforming, indicating that the token is in conformance with the contracted bandwidth parameters of the cell descriptor and that the token is to be inserted into the first random access memory;
    nonconforming, indicating that the token is not in conformance with the contracted bandwidth parameters of the cell descriptor and that the token is to be inserted into the second random access memory; or
    defer, indicating that transmission of the token is to be deferred and that the token is not to be inserted into the first or second random access memory until a token with the same identifier has been outputted.

7. The method of claim 1, wherein the determining step comprises determining that the conformance status is conforming, and wherein the method further comprises immediately outputting the token.

8. The method of claim 1, wherein the determining step comprises determining that the conformance status is nonconforming, and wherein the method further comprises:
    scheduling the token to be inserted into the first random access memory at a later time;
    upon arrival of the later time, transferring the token into a fourth random access memory configured to store the token for transfer to the first random access memory at another later time.

9. The method of claim 8, wherein the step of transferring the token into the fourth random access memory comprises storing the token in a mature list.

10. The method of claim 8, wherein the method further comprises:
    comparing a priority level of the token with other priority levels of other tokens of different virtual connections to determine a highest priority token; and
    transferring the highest priority token from the fourth random access memory to the first random access memory.

11. An integrated circuit configured to provide multiple qualities of service to different virtual network connections, the integrated circuit comprising:

controller circuitry configured to control operations of:
receiving a token of a cell descriptor of data traffic of a virtual network connection, the token including an identifier corresponding to contracted bandwidth parameters of the cell descriptor;
determining whether the token is in conformance with the contracted bandwidth parameters of the cell descriptor to obtain a conformance status;
inserting the token into a first random access memory configured to store the token for immediate output if the conformance status has a first value and a token with the same identifier has not been stored in the first memory;
inserting the token into a second random access memory configured to store the token for non-immediate output if the conformance status does not have the first value and a token with the same identifier has not been stored in the second memory;
otherwise, deferring the token by inserting it into a third random access memory, wherein deferring the token further comprises updating a count corresponding to the identifier of the deferred token;
replacing tokens removed from said first or second memory with deferred tokens from the third memory having the same identifier as the removed tokens until the count corresponding to said same identifier has a predetermined value, wherein said count is updated each time a removed token is replaced with a deferred token.

12. The integrated circuit of claim 11, wherein the operation of inserting the token into the first random access memory further configures the controller circuitry to control storing the token in a port list, and wherein the step of inserting the token into the second random access memory further configures the controller circuitry to control storing the token in a calendar list.

13. The integrated circuit of claim 11, wherein the data traffic includes different virtual network connections transmitted on a single virtual network path.

14. The integrated circuit of claim 11, wherein the token is configured to indicate that the cell descriptor has characteristics including at least one of:
a particular shape identification configured to establish bandwidth parameters of the cell descriptor;
a particular queue identification configured to indicate a relative priority level of the cell descriptor; and
a particular count configured to indicate a number of identical transmit tokens to be transmitted simultaneously.

15. The integrated circuit of claim 11, wherein the operation of receiving the token of the cell descriptor further configures the controller circuitry to control inputting the token into a generic cell rate algorithm engine of the integrated circuit.

16. The integrated circuit of claim 11, wherein the conformance status is one of:
conforming, indicating that the token is in conformance with the contracted bandwidth parameters of the cell descriptor and that the token is to be inserted into the first random access memory;
nonconforming, indicating that the token is not in conformance with the contracted bandwidth parameters of the cell descriptor and that the token is to be inserted into the second random access memory; or
defer, indicating that transmission of the token is to be deferred and that the token is not to be inserted into the first or second random access memory until a token with the same identifier has been outputted.

17. The integrated circuit of claim 11, wherein the determining operation further configures the controller circuitry to control determining that the conformance status is conforming, and wherein the controller circuitry is further configured to control immediately outputting the token.

18. The integrated circuit of claim 11, wherein the determining operation further configures the controller circuitry to control determining that the conformance status is nonconforming, and wherein the controller circuitry is further configured to control operations of:
scheduling the token to be inserted into the first random access memory at a later time;
upon arrival of the later time, transferring the token into a fourth random access memory configured to store the token for transfer to the first random access memory at another later time.

19. The integrated circuit of claim 18, wherein the operation of transferring the token into the fourth random access memory further configures the controller circuitry to control storing the token in a mature list.

20. The integrated circuit of claim 18, wherein the controller circuitry is further configured to control operations of:
comparing a priority level of the token with other priority levels of other tokens of different virtual connections to determine a highest priority token; and
transferring the highest priority token from the third random access memory to the first random access memory.

21. A computer-readable medium carrying one or more sequences of one or more instructions for providing multiple qualities of service to different virtual network connections, the one or more sequences of one or more instructions including instructions which, when executed by one or more processors, cause the one or more processors to perform steps of:
receiving a token of a cell descriptor of data traffic of a virtual network connection, the token including an identifier corresponding to contracted bandwidth parameters of the cell descriptor;
determining whether the token is in conformance with the contracted bandwidth parameters of the cell descriptor to obtain a conformance status;
inserting the token into a first random access memory configured to store the token for immediate output if the conformance status has a first value and a token with the same identifier has not been stored in the first memory;
inserting the token into a second random access memory configured to store the token for non-immediate output if the conformance status does not have the first value and a token with the same identifier has not been stored in the second memory; and
otherwise, deferring the token by inserting it into a third random access memory, wherein deferring the token further comprises updating a count corresponding to the identifier of the deferred token;
replacing tokens removed from said first or second memory with deferred tokens from the third memory having the same identifier as the removed tokens until the count corresponding to said same identifier has a predetermined value, wherein said count is updated each time a removed token is replaced with a deferred token.

22. The computer-readable medium of claim 21, wherein the step of inserting the token into the first random access memory further causes the processor to carry out a step of storing the token in a port list, and wherein the step of inserting the token into the second random access memory further causes the processor to carry out a step of storing the token in a calendar list.

23. The computer-readable medium of claim 21, wherein the data traffic includes different virtual network connections transmitted on a single virtual network path.

24. The computer-readable medium of claim 21, wherein the token is configured to indicate that the cell descriptor has characteristics including at least one of:
   a particular shape identification configured to establish bandwidth parameters of the cell descriptor;
   a particular queue identification configured to indicate a relative priority level of the cell descriptor; and
   a particular count configured to indicate a number of identical transmit tokens to be transmitted simultaneously.

25. The computer-readable medium of claim 21, wherein the step of receiving the token of the cell descriptor further configures the processor to carry out a step of inputting the token into a generic cell rate algorithm engine, and wherein the step of determining whether the token is in conformance is controlled by the generic cell rate algorithm engine.

26. The computer-readable medium of claim 21, wherein the conformance status is one of:
   conforming, indicating that the token is in conformance with the contracted bandwidth parameters of the cell descriptor and that the token is to be inserted into the first random access memory;
   nonconforming, indicating that the token is not in conformance with the contracted bandwidth parameters of the cell descriptor and that the token is to be inserted into the second random access memory; or
   defer, indicating that transmission of the token is to be deferred and that the token is not to be inserted into the first or second random access memory until a token with the same identifier has been outputted.

27. The computer-readable medium of claim 21, wherein the determining step further causes the processor to carry out determining that the conformance status is conforming, and wherein the instructions further cause the processor to carry out a step of immediately outputting the token.

28. The computer-readable medium of claim 21, wherein the determining step further causes the processor to carry out a step of determining that the conformance status is nonconforming, and wherein the instructions further cause the processor to carry out steps of:
   scheduling the token to be inserted into the first random access memory at a later time;
   upon arrival of the later time, transferring the token into a fourth random access memory configured to store the token for transfer to the first random access memory at another later time.

29. The computer-readable medium of claim 28, wherein the step of transferring the token into the fourth random access memory further causes the processor to carry out a step of storing the token in a mature list.

30. The computer-readable medium of claim 28, wherein the instructions further cause the processor to carry out steps of:
   comparing a priority level of the token with other priority levels of other tokens of different virtual connections to determine a highest priority token; and
   transferring the highest priority token from the third random access memory to the first random access memory.

* * * * *